United States Patent [19]
Resman et al.

[11] Patent Number: 5,535,364
[45] Date of Patent: Jul. 9, 1996

[54] ADAPTIVE METHOD FOR DYNAMIC ALLOCATION OF RANDOM ACCESS MEMORY TO PROCEDURES HAVING DIFFERING PRIORITIES BASED ON FIRST AND SECOND THRESHOLD LEVELS OF FREE RAM

[75] Inventors: Mark F. Resman; William E. Egbert; Dale A. Mack, all of Boise, Id.

[73] Assignee: Hewlett-Packard Company, Palo Alto, Calif.

[21] Appl. No.: 46,688

[22] Filed: Apr. 12, 1993

[51] Int. Cl.[6] .................................................. G06F 12/06
[52] U.S. Cl. .................. 395/478; 395/477; 395/479; 395/650; 364/246.1; 364/246.2
[58] Field of Search ......................... 395/425, 478, 395/477, 479, 650, 478, 470, 477, 479; 364/DIG. 1, 246.1, 246.2

[56] References Cited

U.S. PATENT DOCUMENTS

| 4,633,387 | 12/1986 | Hartung | 395/650 |
| 4,947,477 | 8/1990 | Little | 395/497.04 |
| 5,307,473 | 4/1994 | Tsuboi et al. | 395/470 |

FOREIGN PATENT DOCUMENTS

| 0675911 | 3/1994 | Japan | G06F 15/00 |

*Primary Examiner*—Tod R. Swann
*Assistant Examiner*—David J. O'Neill

[57] ABSTRACT

An adaptive method allocates RAM between procedures having both higher and lower priorities. The RAM is provided with first and second portions, the first portion for assignment to higher priority procedures and the second portion for assignment to lower priority procedures, higher priority procedures being able to access also the second portion of RAM. The adaptive method comprises the steps of: responding to a request for allocation of RAM to a higher priority procedure by determining if RAM is available from the first portion and, if not, allocating RAM from the second portion to the higher priority procedure. The method enables allocation of RAM from the second portion to a lower priority procedure when available RAM in the first portion exceeds a first threshold level. The system continues the enablement until the available RAM in the first portion falls below a lower, second threshold level at which point, the allocation of memory in the second portion of RAM to the lower priority procedure is inhibited. The inhibition of allocation of RAM from the second portion to a lower priority procedure continues until the available RAM in the first portion again exceeds the first threshold level.

7 Claims, 3 Drawing Sheets

ADAPTIVE METHOD FOR DYNAMIC ALLOCATION OF RANDOM ACCESS MEMORY TO PROCEDURES HAVING DIFFERING PRIORITIES BASED ON FIRST AND SECOND THRESHOLD LEVELS OF FREE RAM

FIELD OF THE INVENTION

This invention relates to a data processing system which includes random access memory (RAM) that is variably available to differing priority procedures running within the data processing system, and more particularly, to a method for allocating such RAM so as to assure continued availability thereof to procedures having a higher priority.

BACKGROUND of THE INVENTION

Most modern data processing systems allocate RAM, on an as-needed basis, to procedures prior to their execution. Typically, the allocation is predetermined and ensures that each procedure will have available enough RAM to operate at a level comparable to other executing procedures. Because of limited RAM availability, however, some rationing of RAM amongst operating procedures becomes the norm rather than the exception. As a result, the overall performance of a data processing system is reduced when one procedure is "starved" for RAM while another has an abundance of unused RAM. This often occurs where RAM was preallocated and the current task that is executing is not RAM intensive.

The above noted problem is amplified when one procedure comprises an input/output (I/O) task while another procedure comprises an internally executing task within a computer receiving data via the I/O task. If the I/O task is allocated too much RAM, the internally executing procedure that is receiving the data via the I/O task becomes starved for RAM and the overall efficiency of the data processing system is thus impaired. Needless to say, these types of problems can be avoided where there is an abundance of RAM, however, this is rarely the case.

Preallocation of RAM to various procedures that are to execute within a data processing system requires that the user make assumptions on how the RAM is to be utilized by each procedure and the relative levels of performance between the various procedures. Since procedure performance and relative procedure performance are both dependent upon the task at hand, initial assumptions will typically not provide an optimal memory configuration.

As is known, priorities are assigned to various procedures that execute within a data processing system. It is often the case that procedures that control input/output operations are assigned a lower priority than those procedures which perform internal functions within a data processing system. Furthermore, input/output procedures are often assigned a fixed amount of RAM that is solely available to the I/O function and to none other. This preallocation, by its very nature, restricts the amount of communicating data which can either be received or transmitted by the data processing system. If the preassigned RAM for I/O functions is augmented by variably assignable RAM, there is a risk that other, higher priority procedures will be deprived of needed RAM—unless an appropriate RAM management function is implemented.

As an example, a printer has available to it a set amount of RAM depending upon the amount installed by the user. Typically, a portion of the RAM is allocated for I/O buffers and the remainder is used for rendering of the printer page output. Data is transferred from the host computer to the printer and is collected in the I/O RAM. When the I/O RAM is filled, the host computer is instructed to cease further data transmissions. The printer's formatter then consumes the data from the I/O RAM, returns the I/O RAM to the I/O function for further data reception from the host and renders the output page by utilizing remaining RAM for that purpose. Very often, the data transfer from the host computer is held off while the large amount of unused printer RAM remains unused. This action degrades the printer's performance by increasing the time spent by the host waiting to send data files to the printer.

Accordingly, it is an object of this invention to provide a data processing system with an adaptive memory allocation procedure and apparatus.

It is another object of this invention to provide an adaptive memory allocation procedure which prevents lower priority procedures from being allocated RAM when insufficient RAM is available to satisfy higher priority procedures.

It is yet another object of this invention to provide an adaptive memory allocation procedure wherein input/output functions have access to a variable amount of RAM, such variable amount of RAM also being made available to higher priority procedures.

SUMMARY OF THE INVENTION

A data processing system includes an adaptive method for allocation of RAM as between procedures having both higher and lower priorities. The RAM is provided with first and second portions, the first portion for assignment to higher priority procedures and the second portion for assignment to lower priority procedures, higher priority procedures being able to access also the second portion of RAM. The adaptive method comprises the steps of: responding to a request for allocation of RAM to a higher priority procedure by determining if RAM is available from the first portion and, if not, allocating RAM from the second portion to the higher priority procedure. The procedure enables allocation of RAM from the second portion to a lower priority procedure where available RAM in the first portion exceeds a first threshold level. The system continues the enablement until the available RAM in the first portion falls below a lower, second threshold level at which point, the allocation to the lower priority procedure is inhibited. The inhibition of allocation of RAM from the second portion to a lower priority procedure continues until the available RAM in the first portion again exceeds the first threshold level.

DETAILED DESCRIPTION OF THE INVENTION

Figure 1:
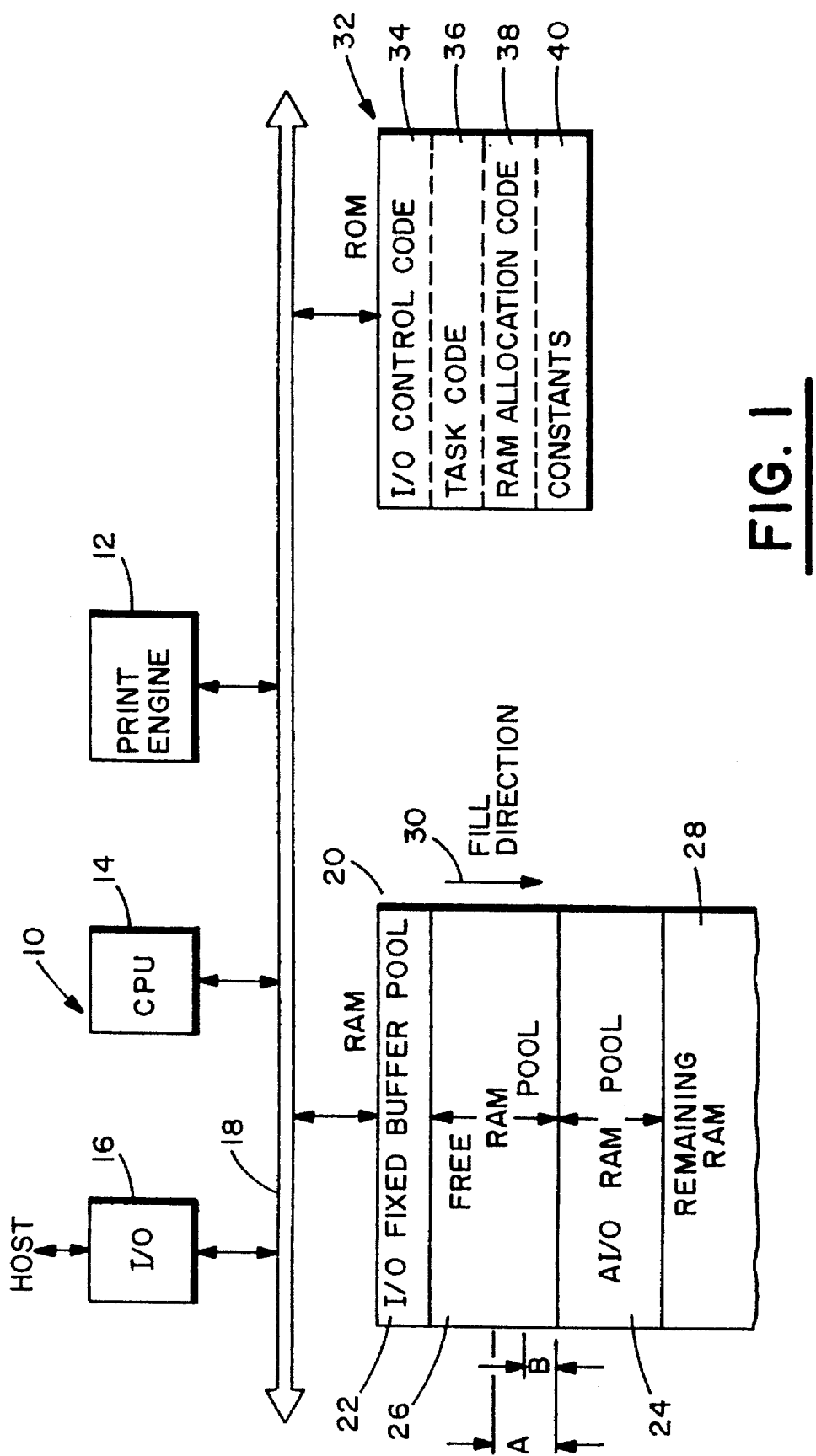
FIG. 1 is a high level block diagram of a data processing system adapted to perform the method of the invention.

Referring now to FIG. 1, a data processing system 10 is, in this instance, a printer that includes a print engine 12, central processing unit (CPU) 14 and an input/output (I/O) control module 16. I/O control module 16 receives data from a host processor, converts it to a form suitable for storage and transmits it, via bus 18, to a RAM 20. Input data from I/O control module 16 is inserted into I/O fixed buffer pool 22 within RAM 20. In addition, an adaptive I/O (AI/O) RAM pool 24 is made available for storage of data received through I/O control module 16, but only under circumstances to be described hereinafter. RAM 20 further includes a free RAM pool 26 that is made available for executing non I/O procedures. RAM 20 is also provided with additional RAM capacity 28 that is assigned to other functions.

In the subsequent discussion, it will be assumed that free RAM pool 26 is filled with data in the direction indicated by arrow 30. Furthermore, the system includes two threshold constants A and B which, respectively, set levels of available, unused RAM within free RAM pool 26.

A ROM 32 is also connected to bus 18 and includes I/O control code 34 for controlling I/O control module 16; task code 36 for controlling the performance of various application tasks; RAM allocation code 38 for controlling allocation of free RAM pool 26 and AI/O RAM pool 24; and constants code 40 which includes, among others, values for free RAM pool levels A and B, respectively.

Figure 2:
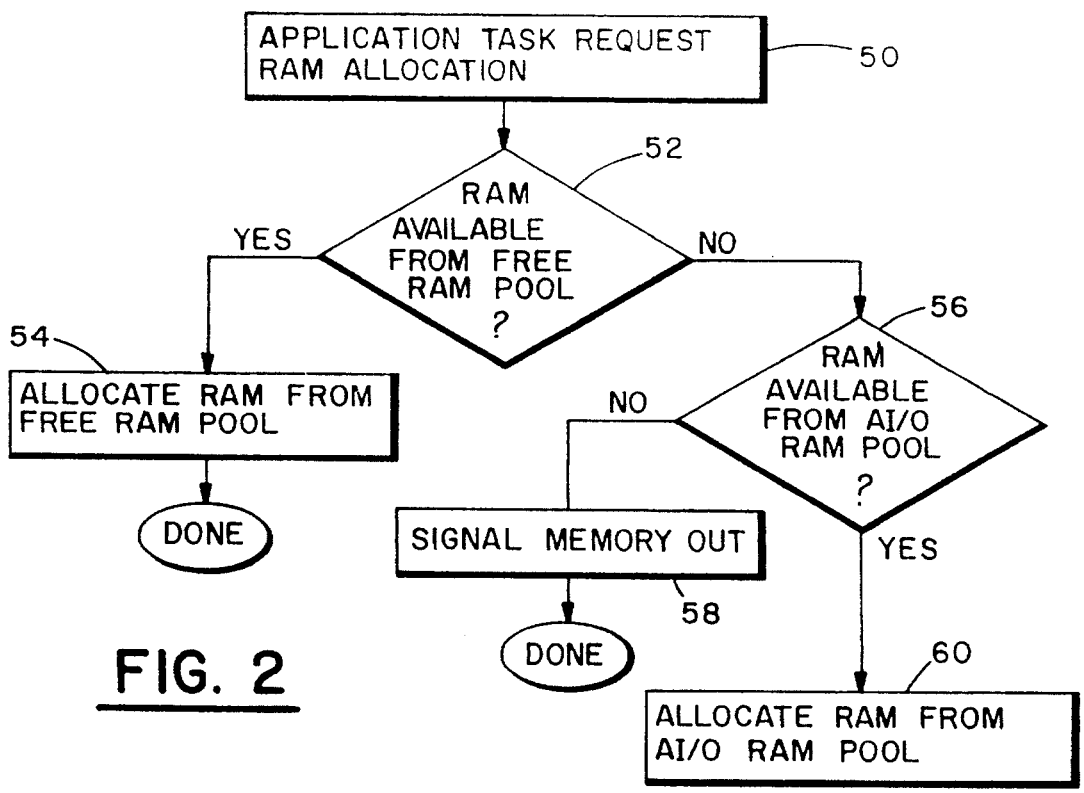
FIG. 2 is a flow diagram illustrating a method of RAM allocation in response to a request from an application task.

Turning to FIG. 2, when an application task running in CPU 14 causes a request to be generated for a RAM allocation within RAM 20, CPU 14 first determines whether RAM is available from free RAM pool 26 (decision box 52). If yes, RAM is allocated to the application task from free RAM pool 26 (box 54) and the procedure is done. If RAM is not available from free RAM pool 26, the procedure determines whether RAM is available from AI/O RAM pool 24 (decision box 56). Since the application task has a higher priority than an I/O task, the AI/O RAM pool 24 is made available thereto to supplement the memory in free RAM pool 26. Thus, if RAM is available from AI/O RAM pool 24, it is allocated to the application task (box 60). If additional memory is not available from AI/O RAM pool 24, then the application task is signalled that there is a memory out condition (box 58) and the procedure is done. Thus, it can be seen that an application task always has priority to RAM in either free RAM pool 26 or AI/O RAM pool 24, notwithstanding the fact that AI/O RAM pool is "reserved" for I/O tasks.

The procedure for allocating available RAM to an I/O task will now be described with respect to FIGS. 3 and 4. In summary, an I/O task is invariably entitled to assignment of RAM from I/O fixed buffer pool 22. At times, an I/O task will be entitled to a RAM allocation from AI/O RAM pool 24, but only when a predetermined level of available RAM is present in free RAM pool 26. In other words, an allocation from AI/O RAM pool 24 to an I/O task will not be made if available memory in free RAM pool 26 falls below a predetermined threshold. Thus, the procedure of the invention enables an application task to be assured that RAM is available to it from AI/O RAM pool 24 when available RAM in free RAM pool 26 is below a threshold.

Figure 3:
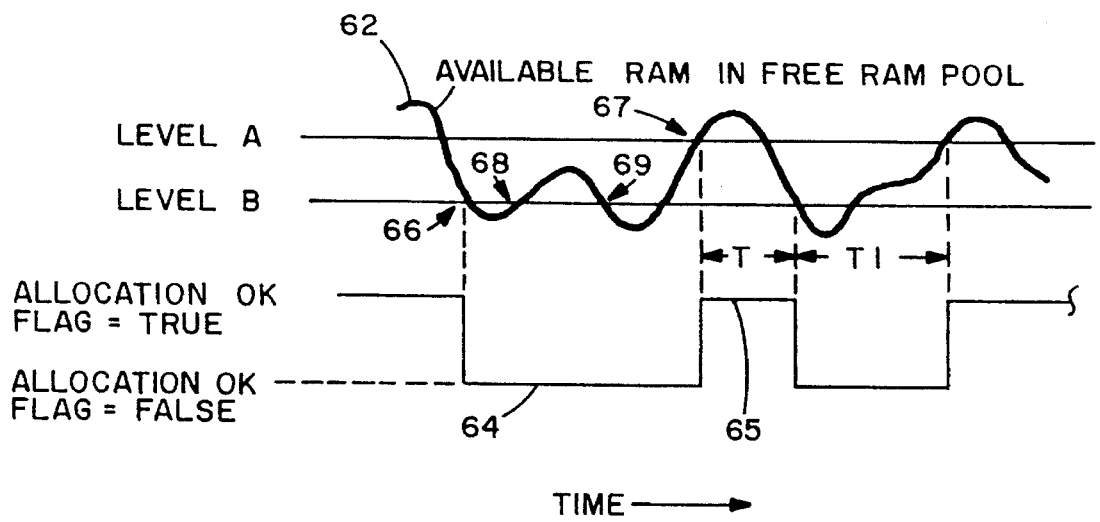
FIG. 3 is a plot illustrating variations in level of available RAM in a RAM pool reserved for application tasks, with a further indication of when allocation from a RAM pool reserved for I/O tasks can be accomplished in dependence upon the RAM level in the RAM pool.

The I/O RAM assignment procedure will be better understood by referring to FIG. 3 wherein curve 62 illustrates a level of available RAM in free RAM pool 26 during the course of carrying out a plurality of tasks by CPU 14. The procedure employs an "allocation OK" flag to signal when an allocation to an I/O task is acceptable from AI/O RAM pool 24. When the allocation OK flag is set true, such an allocation can be made. When the allocation OK flag is set to false, no allocation of RAM from AI/O RAM pool 24 can be made to an I/O task. As can be seen from FIG. 3, when the available RAM (curve 62) in free RAM pool 26 falls below level B, the allocation OK flag is set to false (level 64). Furthermore, the allocation OK flag is not reset to true, i.e., level 65 (enabling an I/O task to have access to AI/O RAM pool 24) until available RAM in free RAM pool 26 exceeds a higher threshold level A. Thus, levels A and B establish a range in the system wherein, after available RAM in the RAM pool 26 falls below level B, no allocation to an I/O task can be made from AI/O ram pool 24. The traversal of an allocation OK flag from true to false is shown on trace 64 at point 66 in FIG. 3. The provision of RAM levels A and B and the preventing of a resetting of the allocation OK flag from false back to true until the available RAM has again exceeded level A (e.g., point 67), prevents a cycling of the allocation OK flag during intermediate traversals of level B by the available RAM level (e.g., points 68, 69).

Figure 4:
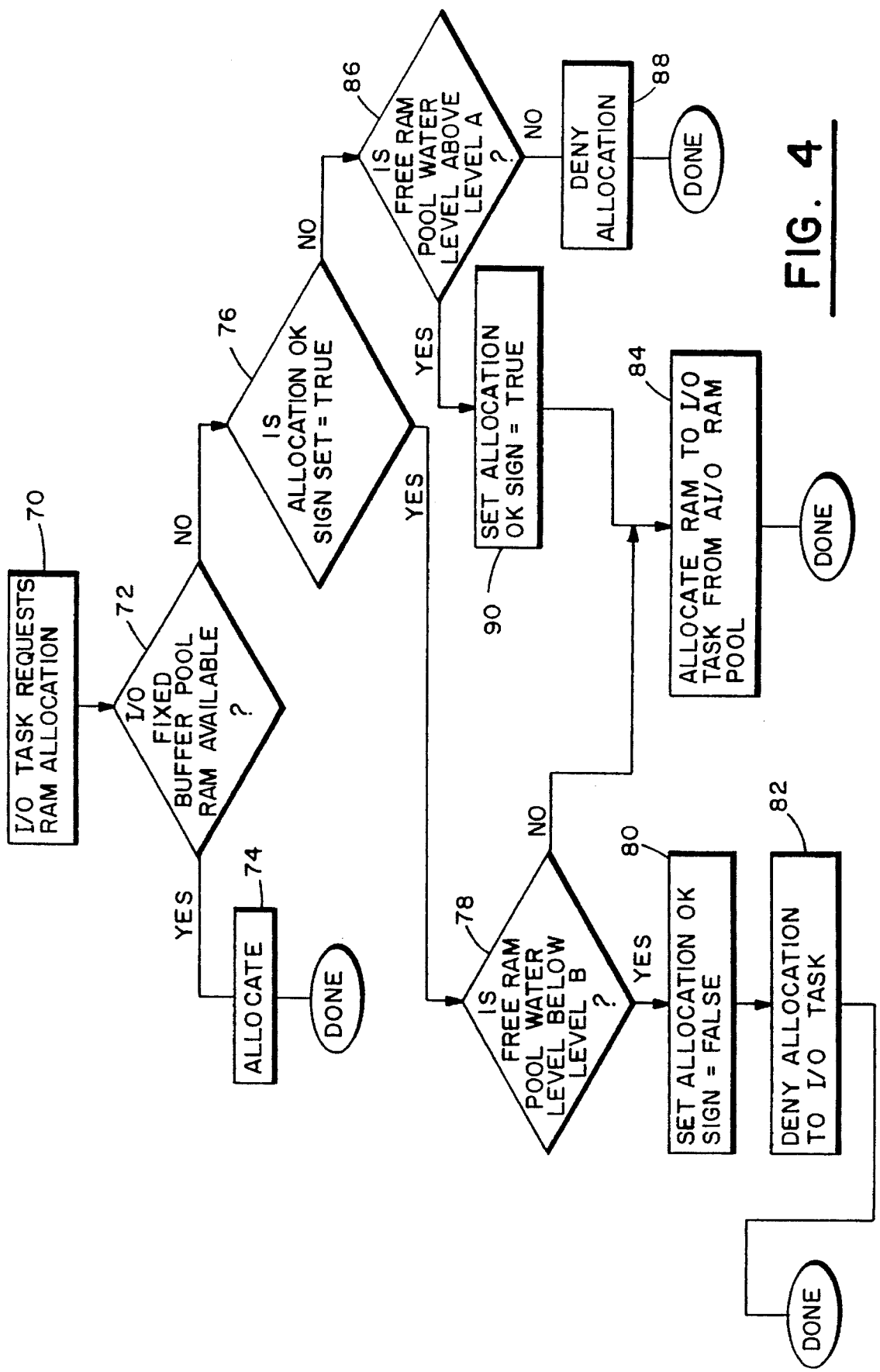
FIG. 4 is a flow diagram illustrating the procedure for making RAM allocations in response to I/O tasks, such procedure being adaptive in response to available RAM in the RAM pool.

The operations which enable the rendering of AI/O RAM pool 24 selectively available to an I/O task are shown in FIG. 4. Initially, it is assumed that an I/O task requests a RAM allocation (box 70). In response, CPU 14 determines whether RAM is available from I/O fixed buffer pool 22. It will be recalled that buffer pool 22 is permanently assigned to I/O control module 16. If memory is available therein, it is employed by I/O control module 16 and the procedure is done. If it is not available, CPU 14 checks to see whether the allocation OK sign is set equal to true (decision box 76).

Referring to FIG. 3, it can be seen that the true setting of the allocation OK sign indicates that the available RAM in free RAM pool 26 has exceeded water level A. Thus it is presumed that there is sufficient RAM available to application tasks and that access to RAM from AI/O RAM pool 24 is not needed for such application tasks.

If the allocation OK sign is set equal to true, the procedure determines (decision box 78) whether, in the intervening time since the allocation OK sign was set equal to true, that RAM within free RAM pool 26 has already been allocated so that its water level is below level B. If yes, the allocation OK sign is set to false (box 80), and the allocation is denied to the I/O task (box 82). Thus, the availability of the AI/O RAM pool 24 to an I/O task is determined based upon the amount of free RAM available in free RAM pool 26—assuring that an application task will not only have that RAM from free RAM pool 26 available to it but also the RAM from the AI/O RAM pool 24.

Returning to decision box 78, if it is determined that the free RAM pool water level is above level B (and that the allocation OK sign was set to true, decision box 76), then it is determined that RAM may be allocated to the I/O task from AI/O RAM pool 24 (box 84). Such a situation is present during time T in FIG. 3.

Returning to decision box 76, if the allocation OK sign is not set to true, the procedure determines whether available RAM in free RAM pool 26 exceeds water level A. This condition occurs when the available RAM has decreased below water level B and has not, as yet, exceeded water level A (e.g., during time T1 in FIG. 3). Assuming that the available RAM has not exceeded level A, allocation is denied (box 88) and the procedure is done. By contrast, once the RAM water level exceeds level A, a yes issues from decision box 86 causing the allocation OK sign to be reset to the true state (box 90). At this point, RAM is allocated to the I/O task from the AI/O RAM pool 24 and the procedure is done.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An adaptive method for allocating random access memory (RAM) in a data processing system, said data processing system performing procedures having higher and lower priorities, said RAM having non-assigned storage including a first portion and a second portion, said first portion available for assignment to higher priority procedure and said second portion available for assignment to a lower priority procedure, said higher priority procedure able to access said second portion, said adaptive method performed by said data processing system and comprising the steps of:

(a) responding to a request for allocation of RAM to a higher priority procedure by determining if RAM is available for allocation from said first portion and, if not, allocating RAM from said second portion to said higher priority procedure; and (b) enabling allocation of RAM from said second portion to a lower priority procedure when RAM that is available for allocation in said first portion exceeds a first threshold level, and continuing the enablement until said RAM that is available for allocation in said first portion falls below a lower, second threshold level, at which point said allocation to a lower priority procedure is inhibited.

2. The method as recited in claim 1 comprising the further step of:

continuing inhibiting the allocation of RAM from said second portion to a lower priority procedure until said RAM that is available for allocation again exceeds said first threshold level.

3. The method as recited in claim 2, wherein said lower priority procedure comprises an input/output task.

4. The method as recited in claim 3, wherein said input/output task is initially assigned an I/O buffer pool of RAM for input data, said input/output task only needing to request an allocation of RAM from said second portion when said I/O buffer pool of RAM has no RAM available.

5. The method as recited in claim 1, wherein said data processing system sets an allocation flag equal to a first state when RAM that is available for allocation in said first portion falls beneath said second threshold level and resets said allocation flag to a second state only when said available RAM in said first portion exceeds said first threshold level, wherein said data processing system examines the state of said allocation flag in determining whether to enable allocation of RAM from said second portion, as recited in steps a and b.

6. The method as recited in claim 5, wherein said data processing system enables allocation of RAM to said lower priority procedure from said second portion when said allocation flag is set to said second state.

7. The method as recited in claim 6, wherein said data processing system disables allocation of RAM to said lower priority procedure from said second portion when said allocation flag is set to said first state.

* * * * *